United States Patent [19]

Rossi

[11] Patent Number: 5,644,320

[45] Date of Patent: Jul. 1, 1997

[54] ANTENNA SYSTEM FOR A NOTEBOOK COMPUTER

[75] Inventor: Markku J. Rossi, Houston, Tex.

[73] Assignee: Compaq Computer Corporation, Houston, Tex.

[21] Appl. No.: 571,636

[22] Filed: Dec. 13, 1995

Related U.S. Application Data

[63] Continuation of Ser. No. 268,953, Jun. 30, 1994, abandoned.

[51] Int. Cl.[6] ....................................................... H01Q 1/24
[52] U.S. Cl. ........................... 343/702; 343/882; 343/889; 343/901
[58] Field of Search .................................. 343/702, 888, 343/889, 895, 900, 901, 882; H01Q 1/24

[56] References Cited

U.S. PATENT DOCUMENTS

| | | | |
|---|---|---|---|
| Re. 34,034 | 8/1992 | O'Sullivan | 379/59 |
| D. 306,433 | 3/1990 | Mitchell | D14/106 |
| D. 312,450 | 11/1990 | Walters, II | D14/106 |
| D. 314,372 | 2/1991 | Morris | D14/106 |
| D. 320,196 | 9/1991 | Carter et al. | D14/107 |
| 3,579,241 | 5/1971 | Antista | 343/901 X |
| 4,136,344 | 1/1979 | Nakai et al. | 343/702 |
| 4,611,213 | 9/1986 | Johnson et al. | 343/702 |
| 4,622,681 | 11/1986 | Snell et al. | 375/48 |
| 4,725,845 | 2/1988 | Phillips | 343/702 |
| 4,742,478 | 5/1988 | Nigro, Jr. et al. | 364/708 |
| 4,837,800 | 6/1989 | Freeburg et al. | 379/59 |
| 4,903,222 | 2/1990 | Carter et al. | 364/708 |
| 4,903,326 | 2/1990 | Zakman et al. | 455/89 |
| 4,972,457 | 11/1990 | O'Sullivan | 379/59 |
| 4,991,197 | 2/1991 | Morris | 379/58 |
| 5,019,823 | 5/1991 | Nonaka | 393/840 |
| 5,020,090 | 5/1991 | Morris | 379/58 |
| 5,020,137 | 5/1991 | Barsumian | 393/702 X |
| 5,127,041 | 6/1992 | O'Sullivan | 379/59 |
| 5,134,648 | 7/1992 | Hochfield et al. | 379/98 |
| 5,138,328 | 8/1992 | Zibrik et al. | 343/702 |
| 5,166,695 | 11/1992 | Chan et al. | 343/702 |
| 5,199,888 | 4/1993 | Condra et al. | 439/142 |
| 5,208,736 | 5/1993 | Crooks et al. | 361/393 |
| 5,245,350 | 9/1993 | Sroka | 343/702 |
| 5,249,218 | 9/1993 | Sainton | 379/59 |
| 5,302,963 | 4/1994 | Wiggenhorn | 343/901 |
| 5,335,368 | 8/1994 | Tanaka | 343/702 X |
| 5,389,940 | 2/1995 | Sutherland | 343/766 X |

FOREIGN PATENT DOCUMENTS

| | | | |
|---|---|---|---|
| 0459279A1 | 5/1990 | European Pat. Off. | H04M 11/06 |
| 0177003 | 10/1983 | Japan | 343/702 |
| 0306703 | 12/1990 | Japan | H01Q 1/24 |
| WO92/10047 | 11/1990 | WIPO | H04M 11/06 |
| WO91/04461 | 4/1991 | WIPO . | |

OTHER PUBLICATIONS

Microcom Announces New Cellular Family, Press Release, (Jun. 26, 1990) Microcom, Inc. of Norwood, MA.
Networking, Infoworld, (Feb. 19, 1990) pp. 31, 39 (PC's Phone Home: Cellular Radio Links).
Installation and User Instructions for the "Portable Cellular Connection", Motorola, Inc., (1992) pp. 1–9.

(List continued on next page.)

*Primary Examiner*—Donald T. Hajec
*Assistant Examiner*—Tho Phan
*Attorney, Agent, or Firm*—Pravel, Hewitt, Kimball & Krieger

[57] ABSTRACT

An antenna system is disclosed that can be extended from the base section of a notebook computer to position the antenna at a predetermined remote distance from electromagnetic interference power produced by the notebook computer. The antenna is rotatable and pivotable for multiple positioning relative to the blocking end of the antenna system that remains in the computer. Advantageously, the antenna system maximizes space by having a hollow blocking end coaxially received about a sleeve retaining the batteries used by the computer. Additionally, the antenna system includes a directional helix antenna rotatable at least 360° by a stepper motor.

20 Claims, 4 Drawing Sheets

OTHER PUBLICATIONS

M. Zimmerman, Microcom Unveils Cellular Modems for Laptop Users, PC Week, (Jun. 25, 1990) one page.

The Cellular Handbook, Microcom, Inc. of Norwood, MA, (1990) pp. 5 and 11 of 14.

MNP Cellular Modems, Microcom Systems, Inc., (1990) 14 pgs.

*Solving Data Communications Problems With The Cellular Network* by Peter Shikli; published in PICO, Jan. 1988; pp. 14–17 (4 pages total).

*Cellular & data: Coming on strong* by Robert C. Adair; published in Cellular Business, Jul. 1987 (2 pages total).

*Toshiba Modem Boasts Wireless Transmission* by Michael R. Zimmerman dated Jun. 18, 1990 (1 page total) (includes discussion of T24D/X cellular modem).

*30th Story of Focus printed in Full format*, Copyright 1990 Information Access Company; Copyright Ziff–Davis Publishing Company 1990 PC Week dated Jun. 18, 1990; pp. 2 and 3 (2 pages total) (includes discussion of T24D/X cellular modem).

*GRiD, PowerTek Debut Cellular/Laptop Combination;* PC Week/Hardware Feb. 26, 1990 (1 page total).

*Powertek Markets Cellular Phone for Grid Laptops* by Nico Krohn; Infoworld Feb. 12, 1990; p. 23 (1 page total).

*Modems;* Copyright #1990 Toshiba America Information Systems, Inc. (2 pages total).

*Traveling Companions;* PC World Feb. 1992; 3 cover pages and pp. 182–189 (11 pages total).

*Introducing the first notebook computer designed to make Windows™ a breeze.* published by Texas Instruments; PC Magazine Apr. 14, 1992 (3 pages total).

Kumar, A.: Fixed and Mobile Terminal Antennas, Artech 1991 pp. 83–95 (7 pages total) (Note: discussion of helical antenna).

Reviews/Product Comparison, Networking and telecommunications; a tale of two techniques; by Tracey Capen, Oct. 4, 1993; Infoworld pp. 100–101 (2 pages total).

Reviews/Product Comparison, Cutting the Cord, Four solutions for building a wireless LAN, by Tracey Capen, Oct. 4, 1993, Infoworld pp. 89–90 (2 pages total).

*McGraw–Hill Encyclopedia of Science & Technology,* 5th Edition, Copyright ©1982 by McGraw–Hill, Inc., Antenna (electromagnetism), 2 cover pages, pp. 573–583 (13 pages total).

*McGraw–Hill Encyclopedia of Science & Technology,* 5th Edition, Copyright ©1982 by McGraw–Hill, Inc., Electromagnetic radiation/Electromagnetic wave/Electromagnetic wave transmission, 2 cover pages, pp. 724–731 (10 pages total).

*Power in Your Pocket,* PC Lap Top Computers Magazine, Jun., 1994, p. 40, re: Motorola Envoy with whip antenna (1 page total).

*Mobile data —a new market opportunity,* Mobile Telecommunications News, Jun., 1990, "Cognito's stylish terminal"; a pocket data network that has a swivel-type monopole or dipole antenna (1 page total).

*Introducing the world's first cellular computer,* Intelligence Technology Corporation, ©1989 Intelligence Technology Corporation (Note: patent pending); the antenna is a conventional retractable dipole or monopole with whip (1 page total).

*Mobitex system description,* Swedish Telecom Radio, Mobitex Int. No. 3, LZBA 703 1100/EN R2 1987 (16 pages total).

*Mobile Data Mission, The history of mobile data, from the viewpoint of a system designer/operator,* Communications, Aug., 1990, pp. 41, 42, 44, 47 and one more non-numbered page (5 pages total).

Ardis$_{SM}$ A Partnership of IBM and Motorola brochure, Code No.: 1050A, 1990 (15 pages total).

Abstract of an article from *PC World,* May, 1993, v11 n5 p60 (1) entitled *A General Magic hand–held.,* Copyright PC World Communications Inc. 1993 (1 page total).

Abstract of an article from *InfoWorld,* Jun. 28, 1993 v15 n26 p1 (2) entitled *General Magic's PDA interface comes to life with realistic objects.,* Copyright InfoWorld Publishing Company 1993 (2 pages total).

Article from *Business Week,* Sep. 12, 1994 entitled *PDA: Premature Death Announcement,* pp. 88–89 (2 pages total).

Article from *PC Magazine,* Oct. 12, 1993 entitled *Pen Pals,* pp. 117, 158, 163 (3 pages total).

Enlarged photograph of EO from above article (item 2A) (1 page total).

*HazCom One™ Self–contained, remote information system designed specifically for emergency applications,* published by Spectrum Cellular Corporation (2 pages total).

Seven (7) brochure published by Spectrum Cellular Corporation including The Bridge™ and The Span™, DataPak™, LapPak™, Span Net™, Go Fax 88™ brochures (17 pages total).

Press Kit published by Intelligence Technology Corporation (21 pages total) note: ITC 286 CAT indicated as patented on p. 17 and photo on p. 16.

*Grid Portable Cellular Workstation Technical Specifications* published by Grid Systems Corporation (1 page total).

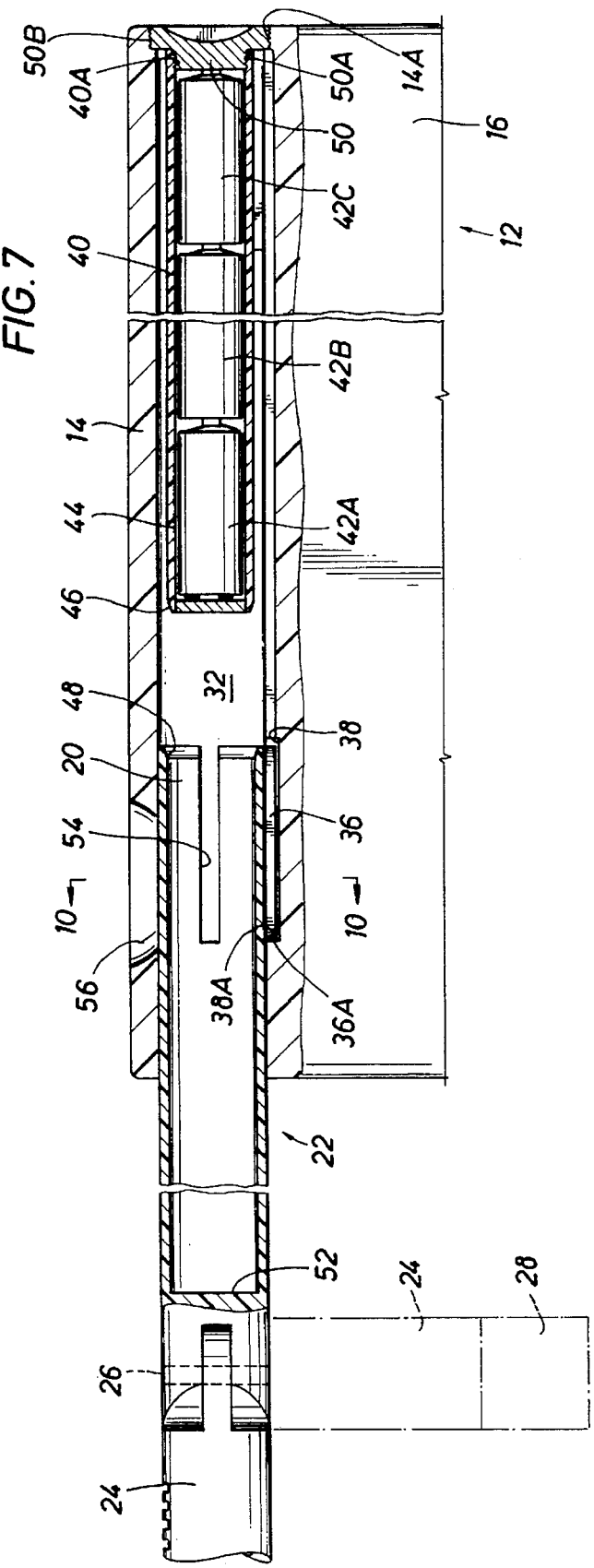

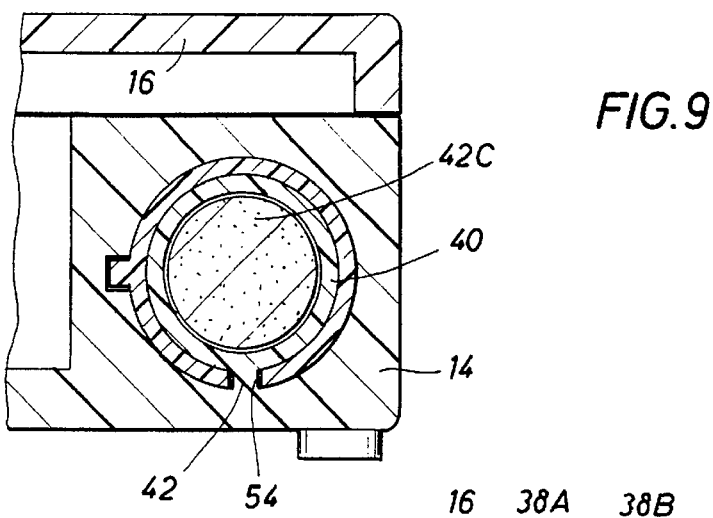
FIG. 9
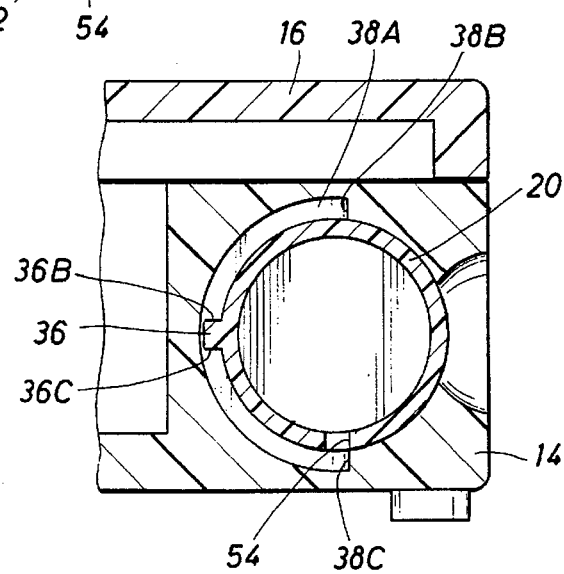
FIG. 10
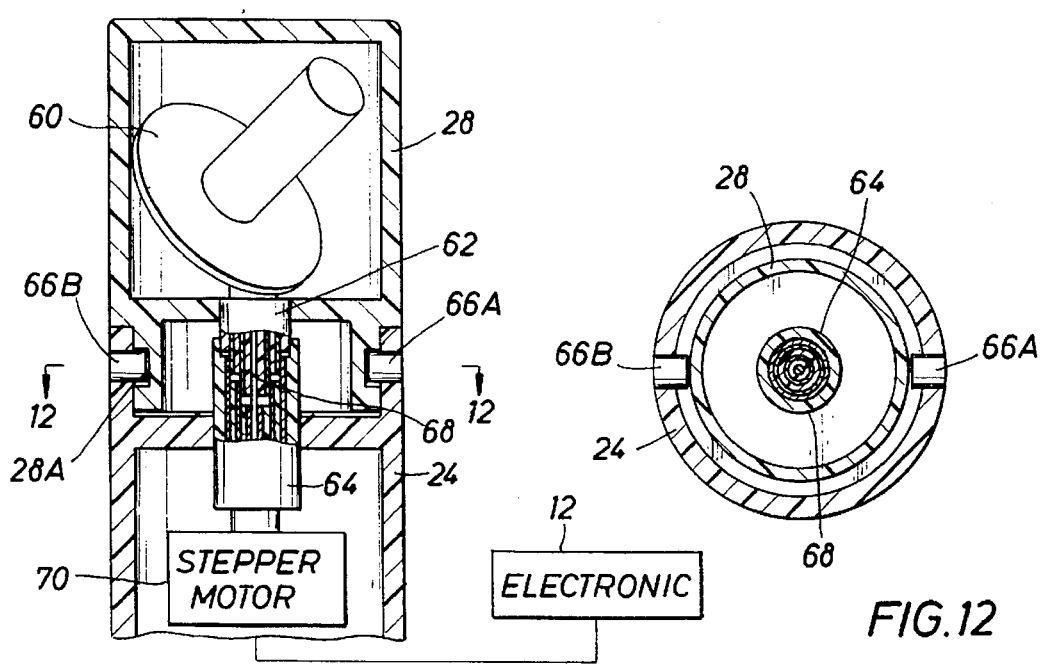
FIG. 11
FIG. 12

ANTENNA SYSTEM FOR A NOTEBOOK COMPUTER

This is a continuation of application Ser. No. 08/268,953 filed on Jun. 30, 1994, now abandoned.

FIELD OF THE INVENTION

This invention relates generally to cellular phones used in combination with a notebook computer and, more particularly, to an antenna system for a cellular notebook computer.

BACKGROUND OF THE INVENTION

Weight and space requirements of portable computers have been constantly decreasing over the years. U.S. Pat. Nos. 5,199,888 and 5,208,736 and patent application Ser. No. 08/188,488 filed Jan. 28, 1994, all assigned to the assignee of the present invention and incorporated herein by reference for all purposes, are examples of notebook computers.

The combination of a cellular telephone with these portable computers has been attempted in the past using separate cellular telephones connected to modems in notebook computers, such as shown in FIG. 3 of WO92/10047 and the Toshiba "T24D/X" device used with the portable computers of Toshiba of Irvine, Calif.

Cellular telephones have also been fabricated integrally with the portable computers. Some of those cellular notebook computers include retractable omnidirectional antennas in the liquid crystal display or LCD section of the computer, such as shown in FIG. 6 of U.S. Pat. No. 4,972,457 and FIGS. 3 and 4 of U.S. Pat. No. 4,991,197. Additionally, Intelligence Technology Corporation of Dallas, Tex. offered the "ITC 286 CAT" cellular notebook computer. The "ITC 286 CAT" computer also has a retractable omnidirectional antenna coming out of the display section.

Intelligence Technology Corporation later introduced a cellular notebook computer with a rail on the back side of the display section to slidably receive a Motorola "DYNA-TAC" cellular phone. Also, GRID Systems Corporation of Fremont, Calif. and PowerTek Industries, Inc of Englewood, Colo. jointly introduced a cellular notebook computer with a proprietary error-correcting feature to increase data-transfer speeds. The cellular telephone of the GRID/PowerTek cellular notebook computer could be separated from the notebook computer and used alone.

One problem with combining a cellular phone with a notebook computer was the undesirable effect of electromagnetic interference power or EMI power emitted by the computer on a cellular phone. The net peak EMI power from notebook computers have been measured at −73 dBm for a Compaq LTE 386s/20 and −90 dBm for an Olivetti Quaderno.

Since the sensitivity of a cellular phone is approximately −110 dBm, EMI power hitting the antenna greater than −110 dBm could prevent the cellular phone from working properly in combination with the computer.

Even if the EMI power is less than the cellular phone sensitivity, the bit error rate of the transmission has been found to increase. Even with the error-correcting features, such as MNP10 or SPCL, the user would experience a slowing down of the transfer speed.

Therefore, with antennas, similar to the "ITC 286 CAT" cellular notebook computer and the cellular notebook computers disclosed in U.S. Pat. Nos. 4,972,457 and 4,991,197, which are incorporated herein for all purposes, positioned adjacent the display section, significant EMI power is picked up from the logic module of the computer.

Other antenna devices now being used include an integral loop antenna which, though inexpensive and directional, is situated near the EMI power sources in the computer. Also, an omnidirectional vertical dipole antenna has been used. Other examples of antennas used with a notebook include U.S. Pat. No. 5,138,328 that discloses the use of dual printed circuit board based antennas located in the display section to provide RF modem capability for a notebook computer.

In summary, the above cellular notebook computers have been undesirable because the antennas are omnidirectional and/or too close to the EMI power produced by the logic module in the computer. Therefore, it would be desirable to provide a directional antenna system that could be remotely positioned from the EMI power emitted by the computer. It would also be desirable if this remote directional antenna system would provide these enhanced operational characteristics with minimum additional space and weight to the notebook computer.

SUMMARY OF THE INVENTION

An antenna system is disclosed that can be extended from the base section of a notebook computer to position the antenna at a predetermined remote distance from electromagnetic interference power produced by the notebook computer. The antenna is rotatable and pivotable for multiple positioning relative to the blocking end of the antenna system in the computer. Advantageously, the antenna system maximizes space by having a hollow blocking end coaxially received about a sleeve retaining the batteries used by the computer. Additionally, the antenna system includes a directional helix antenna rotatable at least 360° by a stepper motor.

BRIEF DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, of which:

FIG. 7 is a section view of the notebook computer with the antenna system illustrating the antenna assembly in the solid lines, similar to FIG. 4, and additionally shows the antenna end of the antenna assembly pivoted in a phantom view;

FIG. 8 is a section view similar to FIG. 7 with the antenna assembly in the fully retracted position, similar to FIG. 5;

FIG. 9 is an enlarged section view taken along line 9—9 of FIG. 8;

FIG. 10 is an enlarged section view taken along lines 10—10 of FIG. 7;

FIG. 11 is an enlarged elevational section view of the antenna end of the antenna assembly of the present invention; and FIG. 12 is a section view taken along lines 12—12 of FIG. 11.

DETAILED DESCRIPTION OF PREFERRED EMBODIMENT

An antenna system, generally indicated at 10, that includes an antenna assembly, a chamber in the notebook computer and aligning sleeve as discussed below, is used in combination with a notebook computer, generally indicated as 12. The notebook computer 12 includes a base section 14 pivotably connected to a display section 16 by a hinge 18, as shown in FIGS. 1, 4–6. The LCD in the display section 16 and the keyboard in the base section 14 are known by those skilled in the art as shown in U.S. Pat. No. 5,208,736.

Figure 1:
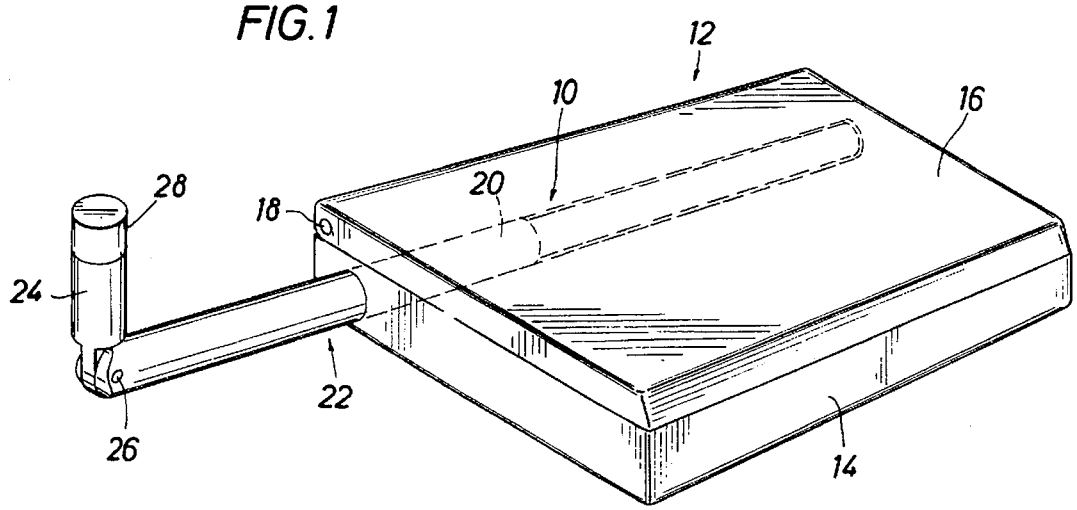
FIG. 1 is a perspective view of a notebook computer including the antenna system of the present invention in the extended and pivoted position.
Figure 2:
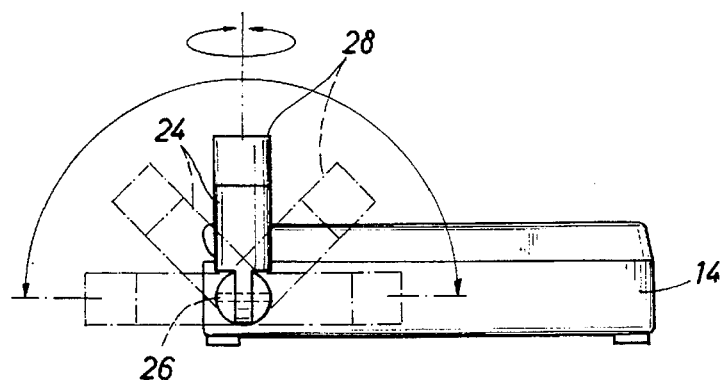
FIG. 2 is the side view of the notebook computer shown in FIG. 1 further illustrating the multiple positioning of the antenna of the antenna assembly in phantom view.
Figure 3:
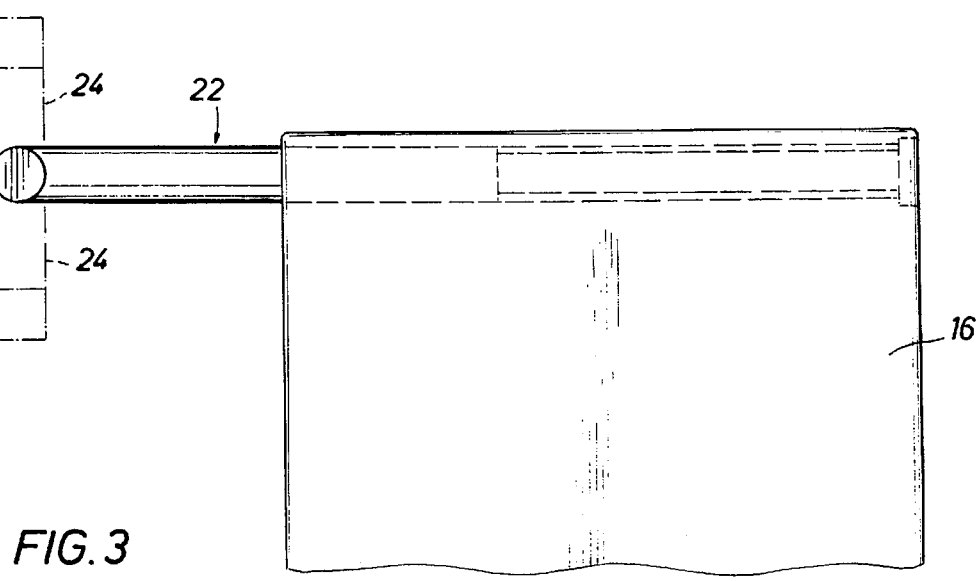
FIG. 3 is a plan view of the notebook computer shown in FIG. 1 further showing positioning of the antenna assembly.
Figure 4:
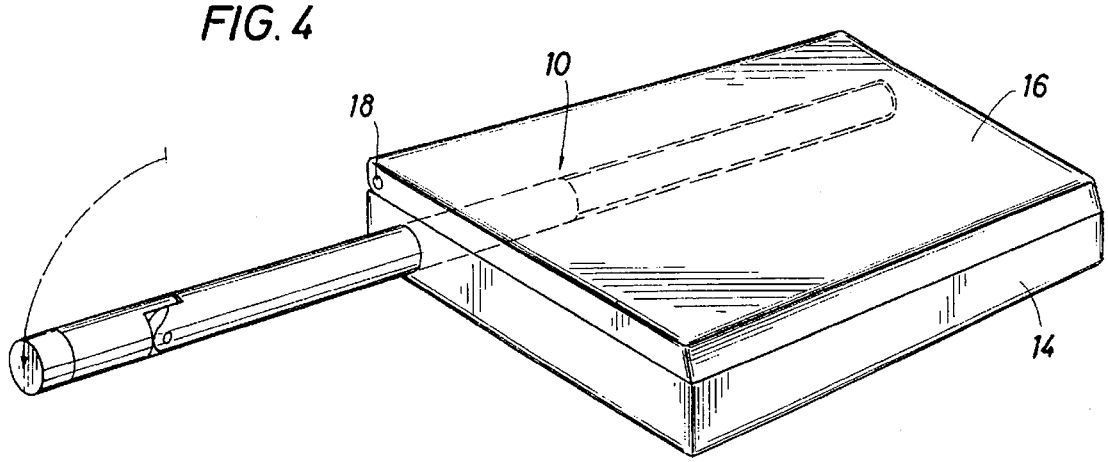
FIG. 4 is a perspective view of the notebook computer similar to FIG. 1, with the antenna end axially aligned with the blocking end of the antenna assembly.
Figure 5:
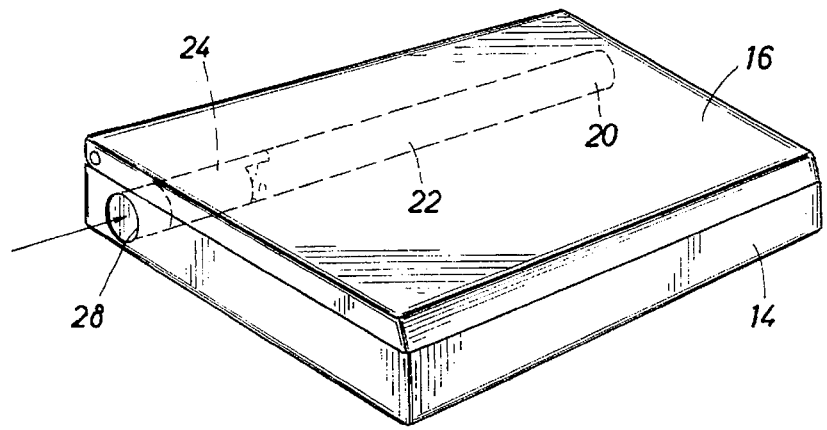
FIG. 5 is a perspective view, similar to FIG. 4, with the antenna assembly in the fully retracted position.

The antenna assembly, generally indicated as 22 and preferably made of plastic, includes a blocking end 20 pivotably connected to an antenna end 24 by a hinge 26. This hinging mechanism, as best shown in FIGS. 1, 2 and 7, allows the antenna end 24 of the antenna assembly 22 to rotate 90° from an axially aligned position, as best shown in FIG. 4, to a pivoted position, as best shown in FIG. 1. The antenna system 10 is designed so that the blocking end 20 of the antenna assembly 22 can be rotated about its axis to provide a number of positions for the antenna end 24, such as shown in FIGS. 2 and 3. The antenna end 24 includes an antenna enclosure 28 that is rotatable at least 360° to provide the desired directional positioning of the antenna system 10, as will be described below in detail. As best shown in FIGS. 5 and 8, the antenna assembly 22 is fabricated so that it can be fully retracted in the notebook computer 12 for storage and transporting purposes.

Figure 6:
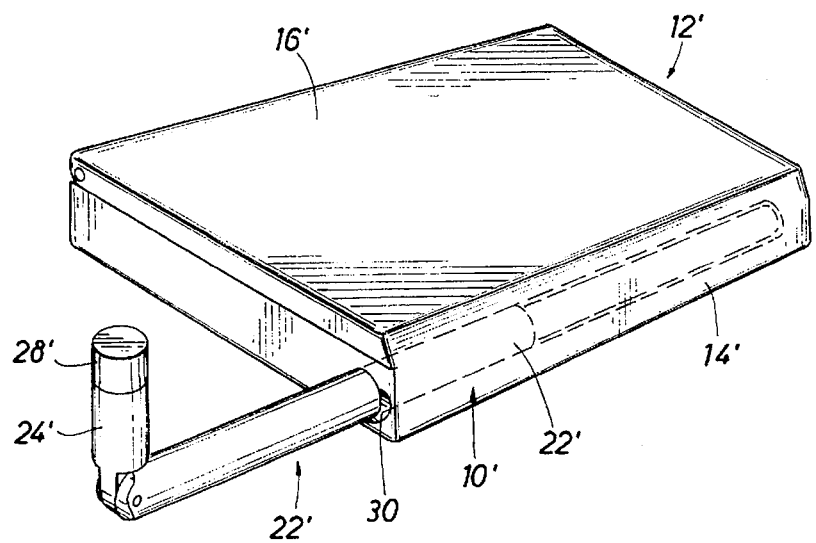
FIG. 6 is an alternative embodiment of the present invention with the antenna system positioned in the front portion of the base section of the notebook computer.

Alternatively, as shown in FIG. 6, the antenna system 10' could be provided in the front portion of the base section 14' of the notebook computer 12'. In this alternative embodiment of the antenna system 10', when the display section 16' is pivoted up for use, the electromagnetic interference power emitted by the display section 16' is positioned further away from the antenna enclosure 28' in the antenna end 24' of the assembly 22'. More particularly, the logic module emitting EMI power could be positioned in the right hand side of the display section 16' with the antenna assembly 22' extending from the left hand side of the base section 14' to provide further distance between the EMI power and the antenna enclosure 28'. Additionally, batteries could be positioned in the front of the notebook computer as is now found in the notebook computer disclosed in patent application Ser. No. 08/188,488 filed Jan. 28, 1994. While the batteries are preferably cylindrical, it is contemplated that other shapes could be used for properly sized batteries, such as oval or rectangular. As shown in FIG. 6, an indentation or recess 30 in the base section 14' could facilitate initial extension of the antenna end 24' from the computer 12'.

Turning now to FIG. 7, a detailed section view of the preferred embodiment of the antenna system 10 is shown that includes a chamber 32 within the base section 14 of the notebook computer 12. The antenna assembly 22 of the antenna system includes the antenna end 24 with the antenna enclosure 28, and the hollow blocking end 20. The blocking end 20 further includes an elongated blocking member 36 that limits further extension of the antenna end 24 from the base member 14. Upon engagement of the shoulder 36A of the blocking member 36 with the shoulder 38A of indentation 38, the antenna assembly 22 is limited from further extension. Upon proper alignment of the blocking member 36 in the indentation 38, as best shown in FIGS. 7 and 10, the antenna assembly 22 can be rotated 180° to provide the multiple positioning of the antenna end 24, as shown in FIGS. 2 and 3. In particular, as shown in FIG. 10, the shoulder 36B would engage the shoulder 38B of the base section 14 to limit further rotation and then upon rotation 180° counterclockwise, the shoulder 36C would engage the shoulder 38C of the base section 14 to limit further rotation. Though 180° was selected as the preferred rotation angle of the antenna assembly 22 to prevent damage to the antenna assembly, other angles, larger or smaller, could be used if desired.

The antenna system 10 further includes a battery sleeve 40 to hold and electrically connect a plurality of batteries 42A, 42B, 42C, preferably sub C size NiMH batteries. The cantilevered end 44 of the sleeve 40 preferably includes a tapered male end 46 to be aligned and received in a similar tapered female end 48 of blocking end 20. The sleeve 40 is preferably coaxially positioned in the chamber 32 by a threaded end member 50 to align the antenna assembly 22 of the antenna system 10. The end member 50 has a cylindrical smooth reduced diameter section 50A and an outwardly threaded larger diameter section 50B. The section 50A is used to slidably engage the smooth surface 40A of the battery sleeve 40 and the larger section 50B is threadedly engaged with the inwardly threaded members 14A of the base section 14. Though not shown, the electrical connection from the batteries 42A, 42B and 42C to the electronics and battery charger could be provided through the cap 50 or other conventional means. The end member 50 can be unscrewed to allow removal and/or replacement of the plurality of batteries. Though preferably three or four sub C cylindrically shaped batteries could be used in the present invention, any other combination of battery sizes, shapes and numbers could be used.

Turning now to FIG. 8, the blocking end 20 of the antenna assembly 22 is shown coextensive with and coaxially positioned radially outward from the battery sleeve 40. Further retraction of the antenna assembly 22 is preferably limited by the engagement of the tapered end 46 of sleeve 40 with the surface 52 of the antenna assembly 22 though other conventional limit means could be used.

As best shown in FIG. 9, a support member 42 is provided approximately the length of battery 42C to provide additional support and proper alignment to battery sleeve 40. The member 42 is preferably monolithic with the sleeve 40 and the base section 14, though it is contemplated that the support member 42 could part of either the sleeve 40 or the base section 14 and be slidably positioned relative to the other member. Furthermore, though the length of the supporting member 42 is one battery length, this length could be any intermediate length between the full length of the sleeve 40 and one battery length to provide the desired structural integrity and alignment of the battery sleeve 40. A slot 54 in the blocking end 20 of the antenna assembly 22, as best seen in FIGS. 7, 9 and 10, is received by the member 42 to allow the antenna assembly 22 to fully retract, as shown in FIGS. 5 and 8.

Instead of a recess 30, as shown in FIG. 6, an opening 56, as best shown in FIGS. 7, 8 and 10, could be provided for initially extension of the antenna end 24 from the chamber 32. As best shown in FIG. 8, a finger pushes the indentations 58 to the left thereby presenting a portion of the antenna closure 28 for further extension. Alternatively, though not shown, a ring or tab could be provided on the top cover 28A of the enclosure 28 for pulling the antenna end 24 from the chamber 32, thereby eliminating the need for an opening 56 or a recess 30.

Turning now to FIG. 11, the antenna end 24 including the antenna enclosure 28 is shown enlarged to better illustrate the helix antenna 60. The helix antenna 60 is fixedly connected in the antenna enclosure 28 that is, in turn, fixedly connected to a first member 62. A second member 64 fixedly connected to the first member 62 is rotated by a stepper motor 70, as shown in FIG. 11. Therefore, the stepper motor 70 rotates the antenna enclosure 28 relative to the lower portion of the antenna end 24. The pins 66A and 66B, as shown best in FIGS. 11 and 12, are fixed to the lower portion of antenna end 24 and received in a groove 28A in the enclosure 28 to guide the rotation of the antenna enclosure 28. A conventional coaxial sliding electrical connection 68 is provided to transfer the radio frequency or RF from the helix antenna to the cellular phone.

The preferred helix antenna 60 is directional and the sensitivity of the helix antenna is low in its backwards direction. A preferred helix antenna would be constructed like the conventional helix antennas used in cellular phones. The small helixes can be wound to be directional when combined with a ground plane.

In use, preferably the helix antenna 60 is directed at 45° from the horizontal, as shown in FIG. 11, so that it is directed away from the logic modules of the notebook computer. Additionally, it is contemplated that a search pattern could be used to optimize the positioning of the helix antenna 60. In this search pattern the computer 12 would first compare the results of six antenna directions at 60° intervals. The strongest direction would then be selected and the antenna would then scan plus and minus 60° while the data transmission is on. When a local maximum within the search is located, the antenna returns to this optimum direction. Also, it is contemplated that the user could receive a message on the LCD of the display section if a 180° turn of the notebook computer is required for optimum reception. The message would only appear when the cellular field strength is weak and its direction of a maximum is the same as the direction to the notebook computer.

The RF module is situated near the rotating helix antenna 60 to minimize interference pickup, to simplify wiring and to conserve space. Also, it is contemplated that the pivoting antenna end 24 could be removable and exchanged for other antenna ends including AMPS, ETACS, NMT and GSM for the U.S.A., United Kingdom, Scandinavia and other areas in Europe. While it is preferable to fully extend the antenna assembly from the computer as the EMI power generally attenuates according to the square of the distance, the antenna assembly could be extended only a fraction of its length, if desired or if limited by space requirements. However, generally it is desirable to have as much distance between the helix antenna 60 and the display section 16 and the base section 14.

It is also contemplated that the antenna assembly could be telescoping, either at the antenna end, the blocking end or both ends.

The foregoing disclosure and description of the invention are illustrative and explanatory thereof, and various changes in the size, shape, and materials, as well as in the details of the illustrated construction may be made without departing from the spirit of the invention.

I claim:

1. A cellular notebook computer emitting electromagnetic interference power when in use, comprising a display section, a base section having a width and being pivotably connected with said display section, said display section and said base section when in the closed position providing a substantially parallelepiped exterior surface, and an antenna assembly having an antenna end and a blocking end and having an antenna enclosure containing an antenna positioned adjacent said antenna end of said assembly, said antenna remaining in said enclosure when moved between a retracted storage position and an extended position, said antenna is positioned a length away from said exterior surface of said sections when said antenna is in the extended position for providing distance between said antenna and said electromagnetic interference power, said length said antenna is positioned away from said exterior surface is greater than half the width of said base section, said antenna being rotatable relative to said blocking end of said assembly when said antenna assembly is in the extended position.

2. The computer of claim 1 having said electromagnetic interference power emitting from said base section.

3. The computer of claim 1 further comprising a battery surrounded radially inwardly from said antenna assembly when said assembly is in said retracted storage position.

4. The computer of claim 1 wherein said antenna assembly being rotatable relative to said base section.

5. The computer of claim 1 wherein said antenna end of said antenna assembly pivots relative to said blocking end of said antenna assembly.

6. The computer of claim 1 wherein said length of said assembly is approximately equal to said base section width so that when said antenna assembly is fully extended but not pivoted it is extended greater than fifty percent of the width of said base section.

7. The computer of claim 1 wherein said antenna enclosure being rotatable relative to a portion of said antenna end of said antenna assembly.

8. The computer of claim 1 wherein said antenna being a helix antenna enclosed in said antenna enclosure.

9. The computer of claim 1 wherein said antenna is electronically positioned in the optimum direction.

10. The computer of claim 9 wherein said antenna is moved by a stepper motor.

11. A cellular notebook computer, comprising a display section, a base section pivotably connected with said display section, an elongated chamber in one of said sections, a sleeve positioned in said chamber, a battery received in said sleeve for providing power to said computer, and an antenna assembly movably disposed in said chamber and positioned radially outwardly around said battery when said antenna assembly is in a retracted storage position, said assembly having an antenna end and a blocking end and having an antenna enclosure containing an antenna positioned adjacent one end of said assembly, said antenna remaining in said enclosure when moved in an extended position outside said sections, said antenna being rotatable relative to one end of said antenna assembly when said antenna assembly is in the extended position.

12. The computer of claim 11 wherein said antenna assembly is movable relative to said sleeve between said retracted storage position and said extended position.

13. The computer of claim 11 wherein said antenna assembly being rotatable within said chamber.

14. The computer of claim 13 wherein said antenna end of said antenna assembly pivots relative to said blocking end of said antenna assembly.

15. The computer of claim 11 wherein said antenna being rotatable relative to a portion of said antenna end of said antenna assembly.

16. The computer of claim 15 wherein said antenna is a helix antenna.

17. The computer of claim 11 wherein said antenna is directional.

18. A cellular notebook computer emitting electromagnetic interference power when in use, comprising a display section, a base section having a width and being pivotably connected to said display section, an antenna assembly having an antenna end and a blocking end and having an antenna enclosure containing an antenna positioned in said antenna end of said assembly, said antenna remaining in said enclosure when moved between a retracted storage position and an extended position, said antenna is positioned a length away from said sections for providing distance between said antenna and the electromagnetic interference power, said length said antenna is positioned away from said sections is greater than half the width of said base section, and said antenna being electronically rotatable relative to said blocking end of said assembly by the computer when said assembly is in the extended position.

19. The computer of claim 18 wherein said antenna end of said antenna assembly pivots relative to said blocking end of said antenna assembly.

20. The computer of claim 18 further comprising a stepper motor for positioning said antenna.

* * * * *